US007126296B1

(12) United States Patent
Burlak et al.

(10) Patent No.: US 7,126,296 B1
(45) Date of Patent: Oct. 24, 2006

(54) SYSTEM AND METHOD FOR ANALOG CONTROL OF DIRECTIONAL MOTORS AND OTHER LOADS

(75) Inventors: Gary J. Burlak, Lake Orion, MI (US); Marian Mirowski, West Bloomfield, MI (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 11/172,122

(22) Filed: Jun. 30, 2005

(51) Int. Cl.
*H02P 1/00* (2006.01)

(52) U.S. Cl. ...................... 318/280; 318/293; 318/256; 318/430

(58) Field of Classification Search ................ 318/280, 318/293, 256, 287, 291, 430, 432, 434, 433; 363/63; 340/426
See application file for complete search history.

(56) References Cited

U.S. PATENT DOCUMENTS 5,146,215 A * 9/1992 Drori ........................ 340/5.22
5,495,155 A * 2/1996 Juzswik et al. ............. 318/293
5,673,017 A * 9/1997 Dery et al. ............ 340/426.17
5,990,739 A * 11/1999 Lam ........................... 330/251

* cited by examiner

*Primary Examiner*—Karen Masih
(74) *Attorney, Agent, or Firm*—Lisa K. Jorgenson; William A. Munck

(57) ABSTRACT

A directional load is capable of operating in multiple directions. For example, a directional motor may rotate in clockwise and counterclockwise directions. A directional load driver generates output signals causing the directional load to operate in one of the directions, thereby providing a requested function. The requested function is identified using an input signal, such as a state-encoded input signal. The state-encoded input signal could be received by the directional load driver over a single wire or through a single input pin. Under the control of the directional load driver, the directional load could perform any of a wide variety of functions. In automotive applications, the directional load could open or close a window, lock or unlock a door, or open or close a door. In other applications, the directional load could be used with a residential door lock, a home automation system, or an industrial control.

23 Claims, 9 Drawing Sheets

SYSTEM AND METHOD FOR ANALOG CONTROL OF DIRECTIONAL MOTORS AND OTHER LOADS

TECHNICAL FIELD

This disclosure is generally directed to control systems and more specifically to a system and method for analog control of directional motors and other loads.

BACKGROUND

Many devices use directional motors and other loads to provide convenient features or functions to users of the devices. The directional motors and other loads are often controlled by input devices, such as buttons or switches.

As an example, directional motors are often used to allow a user to open and close windows and to lock and unlock doors of a motor vehicle. These features are typically referred to as "power windows" and "power door locks." Directional motors could also support an "express" open or close feature, where a window opens or closes completely without requiring the user to continuously depress a button or switch. Directional motors could further be used to adjust drivers' or passengers' seats in the vehicle or to move windshield wipers back and forth across the vehicle's windshield. In addition, directional motors could be used to adjust side rear-view mirrors located on the vehicle's doors, to open and close sliding vehicle doors, and to open and close sunroofs.

Directional motors and other loads are also used outside of the automotive industry. For example, directional motors and other loads could be used with residential door locks and home automation systems. As another example, directional motors and other loads could be used in industrial controls, such as rotary actuators, lag and slide actuators, solenoids, valves, and motors.

SUMMARY

This disclosure provides a system and method for analog control of directional motors and other loads.

In a first embodiment, a directional load driver includes a controller capable of identifying a function associated with a state-encoded input signal. The directional load driver also includes a plurality of transistors capable of generating a plurality of output signals and providing the output signals to a directional load. The directional load is capable of operating in a plurality of directions. The output signals cause the directional load to operate in one of the directions to perform the identified function.

In particular embodiments, the directional load includes a directional motor in a vehicle, and the directional motor is capable of rotating in multiple directions. Also, the identified function includes one of: opening one or more windows, closing one or more windows, express opening one or more windows, express closing one or more windows, unlocking one or more door locks, locking one or more door locks, moving one or more seats, moving one or more windshield wipers, adjusting one or more rear-view mirrors, opening one or more doors, closing one or more doors, opening one or more sunroofs, and closing one or more sunroofs.

In a second embodiment, a system includes a directional load capable of operating in a plurality of directions to perform a plurality of functions. The system also includes an input signal generator capable of generating a state-encoded input signal identifying one of the functions. In addition, the system includes a directional load driver capable of identifying the function associated with the state-encoded input signal, generating a plurality of output signals, and providing the output signals to the directional load. The output signals cause the directional load to operate in one of the directions to perform the identified function.

In a third embodiment, a method includes receiving a state-encoded input signal identifying a function associated with a directional load over a single wire. The directional load is capable of operating in a plurality of directions. The method also includes generating a plurality of output signals associated with the function. In addition, the method includes providing the output signals to the directional load. The output signals cause the directional load to operate in one of the directions to perform the function.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
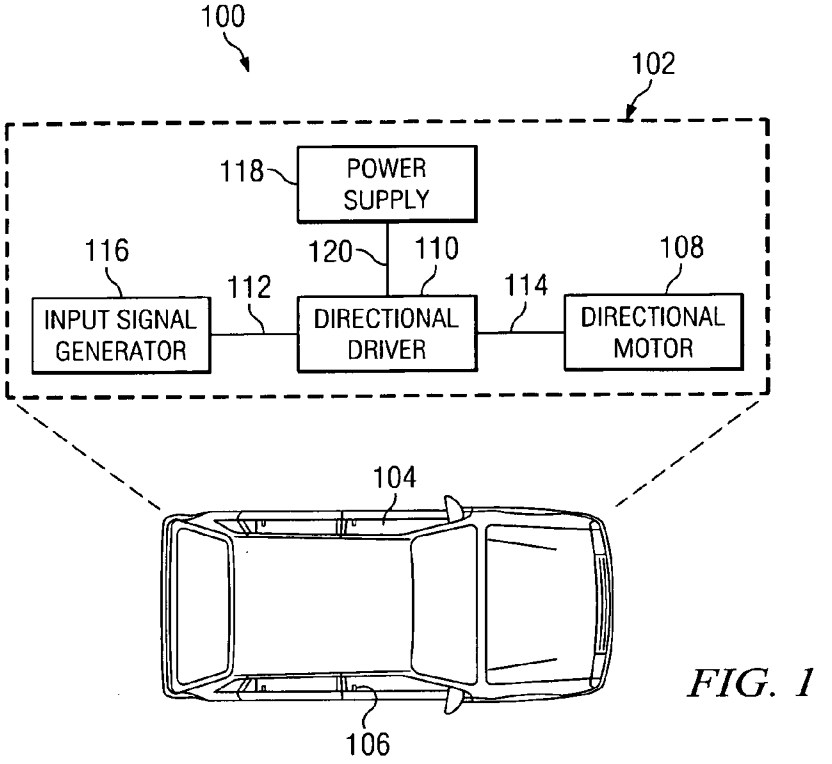
FIG. 1 illustrates an example vehicle having a system for analog control of one or more directional loads according to one embodiment of this disclosure.

FIG. 1 illustrates an example vehicle 100 having a system 102 for analog control of one or more directional loads according to one embodiment of this disclosure. The vehicle 100 and the system 102 shown in FIG. 1 are for illustration only. Other embodiments of the vehicle 100 and the system 102 may be used without departing from the scope of this disclosure.

In this example, the vehicle 100 includes one or more components that are controlled by one or more directional loads. For example, the vehicle 100 may include one or more windows 104 that may be opened and closed using one or more directional motors. The directional motors that open and close the windows 104 could also support an "express" open or close feature. The vehicle 100 may also include one or more door locks 106 that are locked and unlocked using one or more directional motors. The vehicle 100 could include any other or additional components that may be controlled using one or more directional motors, such as drivers' or passengers' seats, windshield wipers, side rear-view mirrors, sliding vehicle doors, and sunroofs.

Elements within the dashed lines of FIG. 1 represent example components implementing the system 102 for analog control of one or more directional loads in the vehicle 100. In this example, the vehicle 100 includes at least one directional motor 108. The directional motor 108 represents any suitable motor or other load capable of rotating or otherwise operating in multiple directions. For example, the directional motor 108 could represent a motor capable of rotating in a clockwise direction and in a counterclockwise direction. The different directions of rotation or operation may be associated with different functions in the vehicle 100. As an example, one direction of operation could cause a window 104 to open, while another direction of operation could cause the window 104 to close. As another example, one direction of operation could cause a door lock 106 to rise (unlock), while another direction of operation could cause the door lock 106 to lower (lock). While described throughout this document as including one or more directional motors 108, the vehicle 100 could include and/or the system 102 could control any other or additional directional loads, such as a solenoid or linear actuator. Also, while the directional motors 108 are described as rotating in different directions, other directional loads may operate differently, such as by moving linearly back and forth. In this document, the phrase "directional load" refers to any load capable of operating in multiple directions.

A directional driver 110 is coupled to the directional motor 108. In this document, the term "couple" and its derivatives refer to any direct or indirect communication between two or more elements, whether or not those elements are in physical contact with one another. The directional driver 110 controls the operation of the directional motor 108. For example, the directional driver 110 could receive an input signal 112 identifying a desired operation of the directional motor 108. The directional driver 110 could then generate output signals 114 that control the directional motor 108 so that the directional motor 108 provides the desired operation. As a particular example, the directional driver 110 could output two output signals 114. One output signal 114 could represent a positive voltage signal, and the other output signal 114 could represent ground. By switching which output signal 114 has the positive voltage and which output signal 114 is ground, the directional driver 110 could control the rotational or operational direction of the directional motor 108. The directional driver 110 could generate any suitable number of output signals 114 for a directional motor 108 and control the directional motor 108 in any suitable manner.

The input signal 112 received by the directional driver 110 identifies the function that should be performed by the directional motor 108. The directional driver 110 uses the input signal 112 to determine which output signals 114 to generate. For example, if the input signal 112 indicates that a user wishes to open a window 104, the directional driver 110 could generate output signals 114 causing the directional motor 108 to rotate in one direction. If the input signal 112 indicates that the user wishes to close the window 104, the directional driver 110 could generate output signals 114 causing the directional motor 108 to rotate in another direction.

In some embodiments, the input signal 112 represents an analog voltage signal, although analog current or other signals could be used. In particular embodiments, the input signal 112 represents a single analog voltage signal received over a single line or wire. In these embodiments, the voltage level of the input signal 112 may identify a specific function, and different voltage levels may identify different functions. In this way, the analog signal may have an operating range that is divided into sub-ranges, where each of the sub-ranges corresponds to a different command or action. As a result, the input signal 112 may be said to represent a state-encoded input signal or voltage signal, where the states represent the functions that can be requested. In other embodiments, the directional driver 110 could receive multiple input signals 112. In this document, a "state-encoded" signal refers to a signal having multiple levels (voltage, current, etc.), where different commands or actions are associated with at least some of the levels.

The directional driver 110 includes any hardware, software, firmware, or combination thereof for controlling the operation of one or more directional motors 108. Example embodiments of the directional driver 110 are shown in FIGS. 2 through 10, which are described below.

An input signal generator 116 is coupled to the directional driver 110. The input signal generator 116 generates the input signals 112 received by the directional driver 110. The input signal generator 116 represents any suitable source of input signals 112. For example, the input signal generator 116 could represent one or more input devices capable of being operated by a user, such as buttons or switches. The input signal generator 116 could also represent an electronic component in the vehicle 100, such as a microcontroller or microprocessor capable of controlling operations in the vehicle 100. The input signal generator 116 could represent any other or additional source of input signals 112. In some embodiments, the input signal generator 116 is capable of providing a single state-encoded analog voltage signal to the directional driver 110 as an input signal 112.

A power supply 118 is coupled to the directional driver 110. The power supply 118 provides a supply voltage 120 to the directional driver 110, which supplies power to the directional driver 110. The directional driver 110 uses the supply voltage 120 to power and control the directional motor 108. The power supply 118 represents any suitable power source or sources, such as a battery.

Although FIG. 1 illustrates one example of a vehicle 100 having a system 102 for analog control of one or more directional loads, various changes may be made to FIG. 1. For example, the vehicle 100 could include any number of directional motors 108, directional drivers 110, input signal generators 116, and power supplies 118. Also, the directional motors 108 could be used to control the windows 104, door locks 106, or any other or additional components of the vehicle 100. Further, each directional driver 110 could control one or multiple directional motors 108. Beyond that, the system 102 could include any other or additional components according to particular needs. In addition, the system 102 could be used in any operational environment, including in non-automotive environments such as homes and industrial systems.

Figure 2:
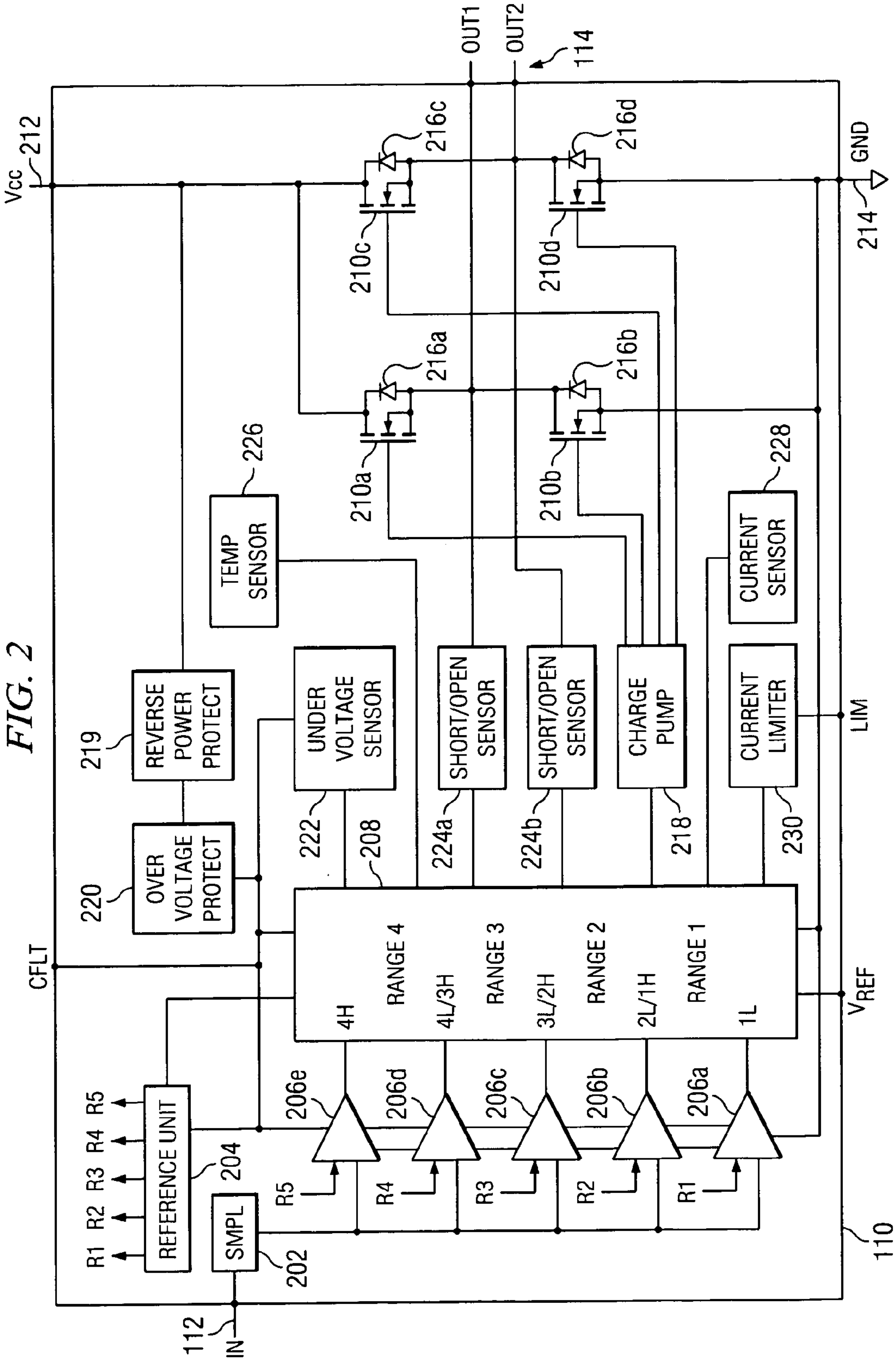
FIG. 2 illustrates a first example directional driver for a directional load according to one embodiment of this disclosure.

FIG. 2 illustrates a first example directional driver 110 for a directional load according to one embodiment of this disclosure. The embodiment of the directional driver 110 shown in FIG. 2 is for illustration only. Other embodiments of the directional driver 110 could be used without departing from the scope of this disclosure.

In this example, the directional driver 110 receives an input signal 112 at pin IN. The input signal 112 represents a single state-encoded voltage signal. The input signal 112 is sampled by an input sampling circuit (SMPL) 202. The input sampling circuit 202 receives the input signal 112, samples or measures the voltage of the signal 112, and holds the sampled voltage for output. The input sampling circuit 202 represents any structure for sampling, conditioning, or filtering an input signal and outputting a control signal, such as a latch or filter.

A reference unit 204 generates multiple reference voltages R1–R5 used in the directional driver 110. The reference unit 204 represents any mechanism for generating multiple reference voltages. For example, the reference unit 204 could represent one or more voltage dividers.

Five comparators 206*a*–206*e* receive the sampled input voltage provided by the input sampling circuit 202 and the reference voltages provided by the reference unit 204. Each of the comparators 206*a*–206*e* compares the sampled input voltage and one of the reference voltages. The comparators 206*a*–206*e* then output signals identifying the results of the comparisons. For example, each of the comparators 206*a*–206*e* could output a logical value of zero if the sampled input voltage is less than the received reference voltage and a logical value of one if the sampled input voltage exceeds the received reference voltage. Each of the comparators 206*a*–206*e* includes any structure for comparing voltages.

A controller 208 controls the operation of the directional driver 110 and causes the directional driver 110 to generate output signals 114, which control the operation of a directional motor 108. For example, in some embodiments, the input signal 112 represents a single state-encoded voltage, and different voltage ranges are associated with different functions or commands. As an example, if the voltage of the input signal 112 falls within a first voltage range, the controller 208 could cause a directional motor 108 to open a vehicle window 104. If the voltage of the input signal 112 falls within a second voltage range, the controller 208 could cause a directional motor 108 to close the vehicle window 104. If the voltage of the input signal 112 falls within a third voltage range, the controller 208 could cause a directional motor 108 to perform an express open of the vehicle window 104. In this embodiment, the reference voltages R1–R5 define four voltage ranges, although any suitable number of voltage ranges could be defined and used in the directional driver 110.

The outputs of the comparators 206*a*–206*e* identify the voltage range in which the current sample of the input signal 112 falls. For example, the output of comparator 206*a* indicates whether the sampled input voltage exceeds the lower threshold (1L) of the first voltage range. The output of comparator 206*b* indicates whether the sampled input voltage exceeds the upper threshold (1H) of the first voltage range and/or the lower threshold (2L) of the second voltage range.

Using the outputs of the comparators 206*a*–206*e*, the controller 208 identifies the voltage range in which the sampled input voltage falls. For example, the controller 208 could analyze the outputs of the comparators 206*a*–206*e* to identify the voltage range where the sampled input voltage exceeds the lower threshold but not the upper threshold. The controller 208 then controls the operation of other components in the directional driver 110 to produce appropriate output signals 114 to implement the function associated with the identified voltage range. For example, the controller 208 could cause the directional driver 110 to generate output signals 114 to open, close, or express open a window 104 in the vehicle 100 based on the identified voltage range. The controller 208 includes any hardware, software, firmware, or combination thereof for controlling the generation of output signals, which are used to control a directional motor.

The output signals 114 are generated by four switching transistors 210*a*–210*d*. Each of the switching transistors 210*a*–210*d* is coupled either to a supply voltage 212 at pin $V_{CC}$ or to ground 214 at pin GND. Each of the switching transistors 210*a*–210*d* is capable of operating in a conducting state (coupling its source and drain) or a non-conducting state. As shown in FIG. 2, two transistors 210*a*–210*b* are used to generate a first output signal 114 at pin OUT1, and two transistors 210*c*–210*d* are used to generate a second output signal 114 at pin OUT2.

In this embodiment, the controller 208 causes the two transistors 210*a*–210*b* to provide either the supply voltage 212 or ground 214 as the first output signal 114. For example, the controller 208 could place the transistor 210*a* in a conducting state and the transistor 210*b* in a non-conducting state, thereby providing the supply voltage 212 as the first output signal 114. Similarly, the controller 208 could place the transistor 210*a* in a non-conducting state and the transistor 210*b* in a conducting state, thereby providing ground 214 as the first output signal 114. A similar technique could be used to generate the second output signal 114. In this way, the directional driver 110 could cause a directional motor to operate in one direction by outputting the supply voltage 212 as one output and ground 214 as the other output. The directional driver 110 could cause the directional motor to operate in the other direction by swapping the outputs. Each of the switching transistors 210*a*–210*d* represents any suitable transistor or combination of transistors, such as an n-channel Metal-Oxide Semiconductor Field Effect Transistor ("MOSFET").

As shown in FIG. 2, four diodes 216*a*–216*d* are used to limit or prevent undesired current flow between the sources and drains of the switching transistors 210*a*–210*d*. Each of the diodes 216*a*–216*d* represents any suitable type of diode and number of diodes.

The switching transistors 210*a*–210*d* are placed in the appropriate conducting and non-conducting states by a charge pump 218. The charge pump 218 is coupled to the gates of the switching transistors 210*a*–210*d* and to the controller 208. The charge pump 218 provides suitable voltages to the gates of the switching transistors 210*a*–210*d* to control the toggling of the switching transistors 210*a*–210*d* between the conducting and non-conducting states. The charge pump 218 operates under the control of the controller 208. For example, the controller 208 could cause the charge pump 218 to place one of the transistors 210*a*–210*c* in a conducting state and to place one of the transistors 210*b*–210*d* in a conducting state. The charge pump 218 includes any structure capable of providing control voltages to the gates of multiple switching transistors.

The directional driver 110 also includes various components that help to protect the directional driver 110 in its operational environment. For example, a reverse power protector 219 may help to reduce or prevent damage to the directional driver 110 caused by reverse installation of a battery or other power source providing the supply voltage 212. An over-voltage protector 220 may help to reduce or prevent damage to the directional driver 110 caused by an excessive supply voltage 212. In this example, the reverse power protector 219 and the over-voltage protector 220 operate in series on the supply voltage 212. The over-voltage protector 220 then provides a voltage to the reference unit 204, the comparators 206*a*–206*e*, the controller 208, and an under-voltage sensor 222, thereby protecting these components from excessive supply voltages 212. The reverse power protector 219 represents any structure capable of mitigating damage caused by reverse installation of a power supply. The over-voltage protector 220 represents any structure capable of mitigating damage caused by excessive supply voltages.

The under-voltage sensor 222 detects a supply voltage 212 that is less than a calculated threshold. To protect against possible damage from the lower supply voltage 212, the under-voltage sensor 222 detects this condition and signals the controller 208. The controller 208 may then take any appropriate action, such as entering a protective state where the operations of the directional driver 110 are reduced. The under-voltage sensor 222 represents any structure capable of detecting under-voltage conditions.

Two short/open sensors 224*a*–224*b* protect the directional driver 110 against short circuits and against unconnected output pins OUT1 and OUT2. For example, one or more of the pins OUT1 and OUT2 could be coupled directly to ground because of a short circuit, and the short/open sensors 224*a*–224*b* may detect this condition. One or more of the pins OUT1 and OUT2 could also be uncoupled from a directional motor 108, and the short/open sensors 224*a*–224*b* may detect this condition as well.

A temperature sensor 226 protects the directional driver 110 against excessive temperatures. For example, the temperature sensor 226 could measure the temperature of the directional driver 110 and report this temperature to the controller 208. If the temperature exceeds a threshold, the controller 208 could take any appropriate action, such as entering a protective state. The temperature sensor 226 represents any structure capable of measuring a temperature.

The directional driver 110 also includes a current sensor 228 and a current limiter 230. The current sensor 228 measures the amount of current provided through the output pins OUT1 and OUT2. If the amount of current exceeds a threshold, the controller 208 could take any appropriate action, such as entering a protective state. The current sensor 228 represents any structure capable of measuring current.

The current limiter 230 is capable of limiting the amount of current provided through the output pins OUT1 and OUT2. For example, the directional driver 110 could be used with a wide variety of different directional motors, and different directional motors may require different amounts of current. The current limiter 230 identifies the maximum amount of current needed for a specific application and informs the controller 208. In particular embodiments, a resistance may be coupled to the current limiter 230 through pin LIM, or the current limiter 230 may be coupled directly to ground. If coupled to ground, the current limiter 230 may allow a maximum current to be drawn from the directional driver 110. If coupled to a resistor, the amount of current that can be drawn from the directional driver 110 may be based on the resistance, where larger resistances result in smaller amounts of current and smaller resistances result in larger amounts of current. The current limiter 230 represents any structure capable of identifying a maximum amount of current to be provided to a directional motor.

As shown in FIG. 2, a power filter may be coupled to the directional driver 110 through pin $C_{FLT}$. The power filter may help to reduce or eliminate variations in the supply voltage 212. For example, the power filter may include one or more capacitors capable of providing additional voltage when the supply voltage 212 temporarily dips.

A voltage is provided to the directional driver 110 through pin $V_{REF}$. The voltage received at pin $V_{REF}$ regulates how the input signals 112 are decoded by the directional driver 110. For example, if no voltage is provided at pin $V_{REF}$ or the voltage at pin $V_{REF}$ is pulled high, the directional driver 110 may assume that the supply voltage received at pin $V_{CC}$ is unregulated. This may occur, for example, when pin $V_{CC}$ of the directional driver 110 is coupled to a battery or other unregulated power source. If pin $V_{REF}$ is coupled to ground, the directional driver 110 may assume that the supply voltage received at pin $V_{CC}$ is a regulated voltage, such as +5V.

The voltage at pin $V_{REF}$ is provided to the controller 208, which determines whether the directional driver 110 should operate in regulated or unregulated mode. If unregulated mode is used, the controller 208 causes the reference unit 204 to scale the reference voltages R1–R5 based on the actual supply voltage received at pin $V_{CC}$. For example, the supply voltage at pin $V_{CC}$ could have a maximum of 16V, and the reference unit 204 may scale the reference voltages R1–R5 by a factor equaling the ratio of the actual received voltage over 16V. If 14V are received, the reference unit 204 could scale the reference voltages R1–R5 by a factor of 0.875 (14V/16V). If 8V are received, the reference unit 204 could scale the reference voltages R1–R5 by a factor of 0.5 (8V/16V). In this way, the controller 208 and the reference unit 204 may adjust the operation of the directional driver 110 as the supply voltage received from an unregulated voltage source changes.

Figure 3:
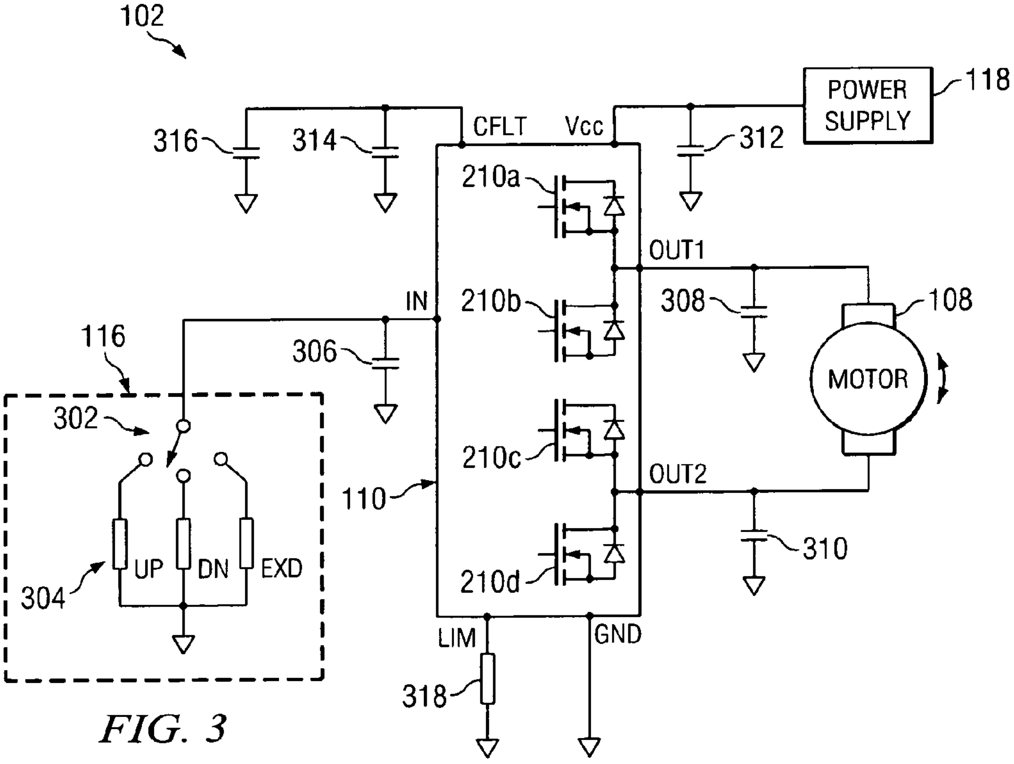
FIGS. 3 and 4 illustrate example implementations of the directional driver of FIG. 2 in a system for analog control of a directional load according to one embodiment of this disclosure.
Figure 4:
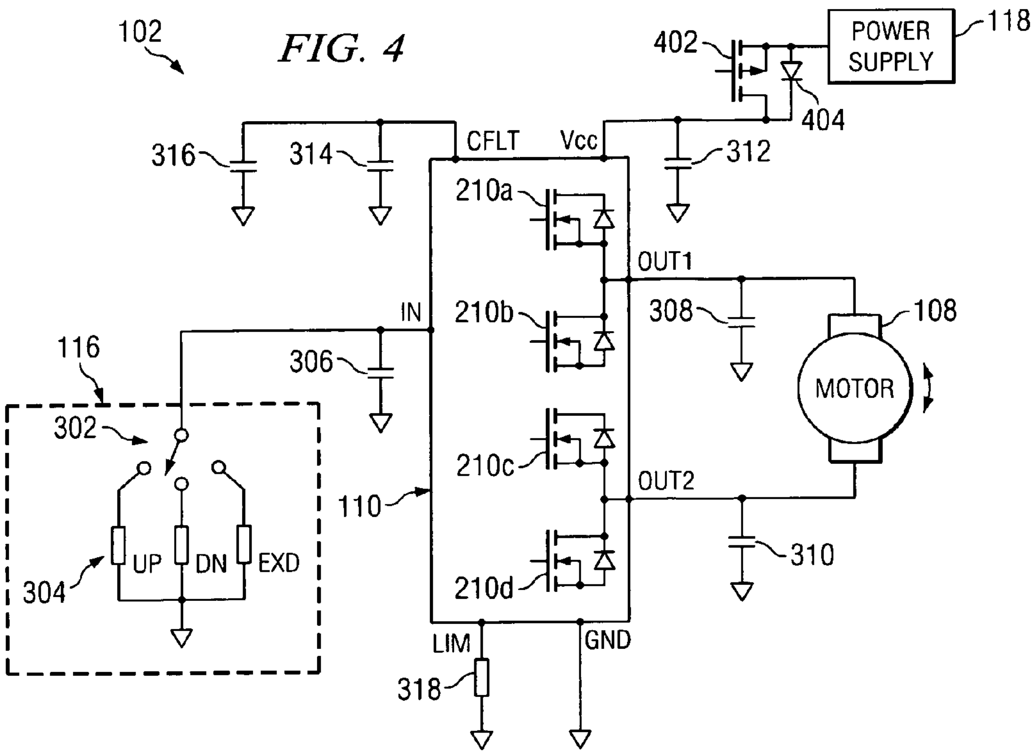

FIGS. 3 and 4 illustrate example implementations of the directional driver 110 of FIG. 2 in a system 102 for analog control of a directional load according to one embodiment of this disclosure. The example implementations shown in FIGS. 3 and 4 are for illustration only. The directional driver 110 of FIG. 2 may be used in other systems without departing from the scope of this disclosure.

In FIG. 3, the directional driver 110 is coupled to an input signal generator 116, which includes a switch 302 and multiple resistors 304. The switch 302 is an input device having multiple settings that may be selected by a user, such as a driver of the vehicle 100. In this example, the switch 302 has three settings, which correspond to "up," "down," and "express down" (EXD) functions for a window 104 in the vehicle 100. The switch 302 represents any structure having multiple settings for selection by a user.

Each setting of the switch 302 is associated with a different resistor 304. The resistors 304 may have different resistances from one another. When a user operates the switch 302, one of the resistors 304 is coupled to and creates a voltage at pin IN of the directional driver 110. The different resistances of the resistors 304 lead to the creation of different voltages at pin IN of the directional driver 110. In this way, different functions may be associated with different resistors 304, different voltages may be generated using the resistors 304, and the directional driver 110 may identify different functions selected by a user using the voltages. Each of the resistors 304 may have any suitable resistance.

The switch 302 and pin IN are coupled to a capacitor 306. The pins OUT1 and OUT2 are coupled to capacitors 308 and 310, respectively. The power supply 118 is coupled to a capacitor 312. The pin $C_{FLT}$ is coupled to capacitors 314–316. The capacitors 306–316 may have any suitable capacitance(s). For example, each of the capacitors 306–314 could have a capacitance of 0.1 µF, and the capacitor 316 could have a capacitance of 47 µF.

As shown in FIG. 3, pin LIM may be coupled to a resistor 318. The resistor 318 is optionally coupled to pin LIM and may have any suitable value depending on the current to be provided to the directional motor 108. If no resistor 318 is coupled to pin LIM, pin LIM is coupled directly to ground, and the directional driver 110 could provide a maximum amount of current to the directional motor 108.

The implementation of the directional driver 110 shown in FIG. 4 is similar to the implementation of the directional driver 110 shown in FIG. 3. In the implementation shown in FIG. 4, the power supply 118 is coupled to pin $V_{CC}$ through a transistor 402 and a diode 404. The transistor 402 could represent any suitable transistor or combination of transistors, such as a p-channel MOSFET. The diode 404 reduces or prevents undesired current flow from the directional driver 110 to the power supply 118. The diode 404 represents any suitable type of diode and number of diodes. In this embodiment, the transistor 402 and diode 404 provide additional protection against reverse installation of the power supply 118. The gate of the transistor 402 may be coupled to any suitable component in the system 102 that is capable of controlling the transistor 402.

Figure 5:
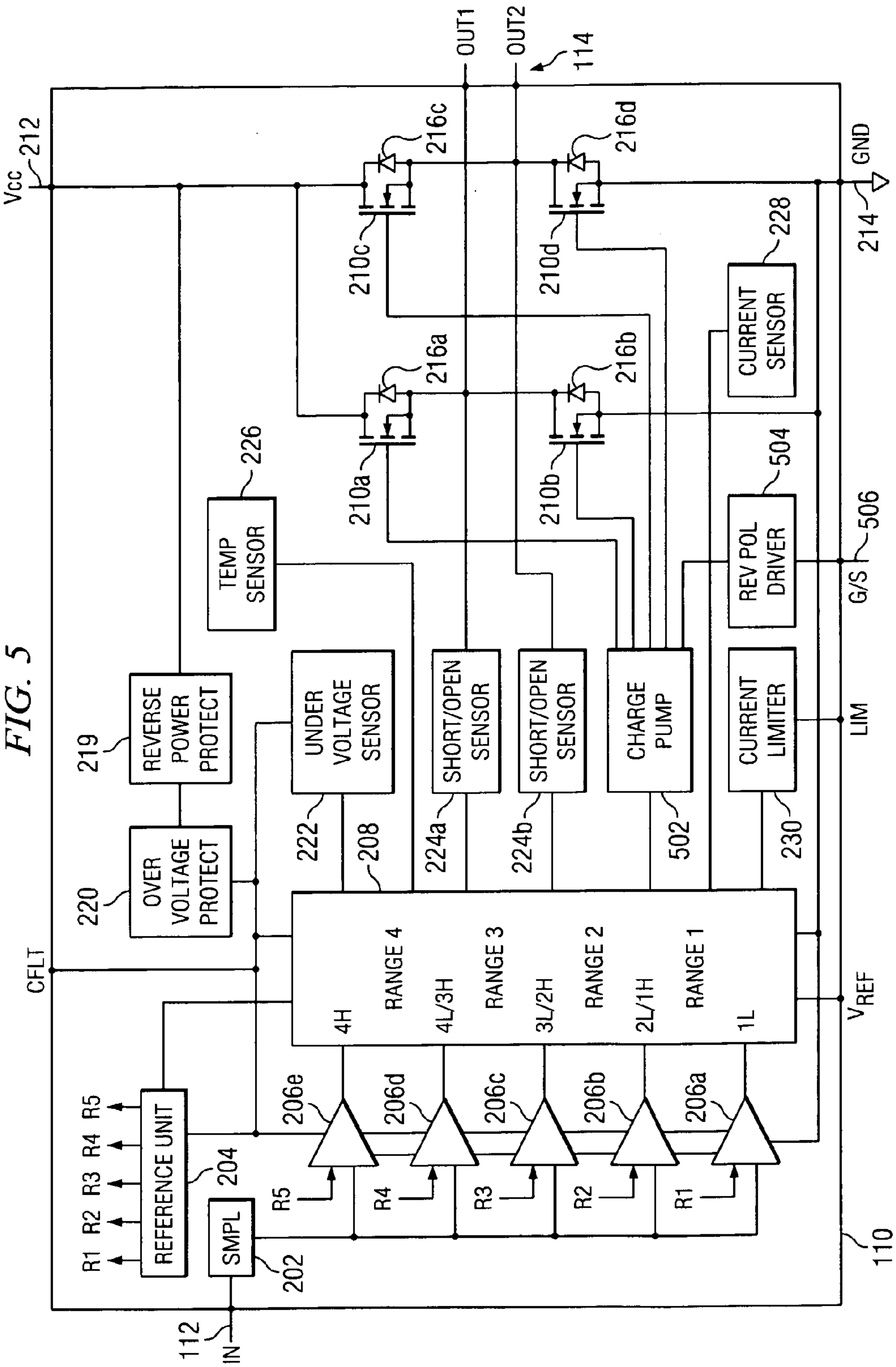
FIG. 5 illustrates a second example directional driver for a directional load according to one embodiment of this disclosure.

FIG. 5 illustrates a second example directional driver 110 for a directional motor 108 according to one embodiment of this disclosure. The embodiment of the directional driver 110 shown in FIG. 5 is for illustration only. Other embodiments of the directional driver 110 could be used without departing from the scope of this disclosure.

In this example, the charge pump 218 having four outputs from FIG. 2 has been replaced with a charge pump 502 having five outputs. The charge pump 502 continues to control the switching transistors 210*a*–210*d*. A fifth output from the charge pump 502 is provided to a reverse polarity driver 504. The charge pump 502 outputs a signal to the reverse polarity driver 504 when the controller 208 detects reverse installation of a power supply. The reverse polarity driver 504 receives the signal from the charge pump 502 and drives a go/stop (G/S) signal 506 at pin G/S. The G/S signal 506 acts as an indicator to inform other components in the system 102 of the reverse powers supply installation and may be provided to any suitable destination. The reverse polarity driver 504 represents any structure for driving a signal identifying the reverse installation of a power supply.

Figure 6:
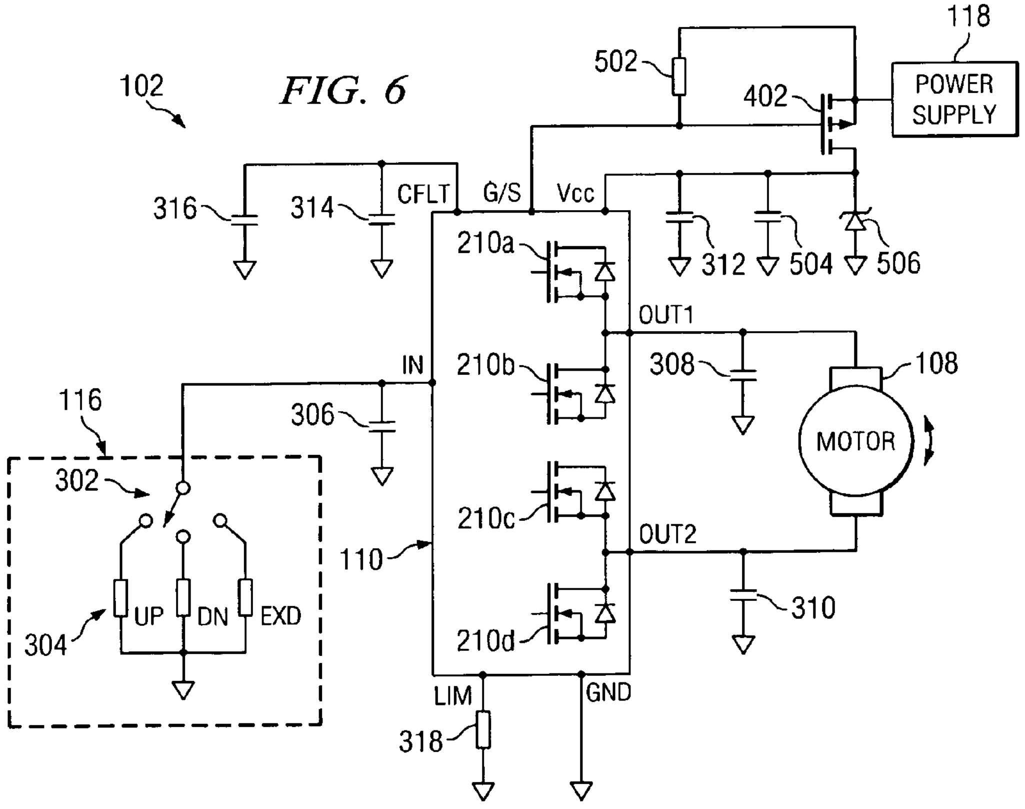
FIG. 6 illustrates an example implementation of the directional driver of FIG. 5 in a system for analog control of a directional load according to one embodiment of this disclosure.

FIG. 6 illustrates an example implementation of the directional driver 110 of FIG. 5 in a system 102 for analog control of a directional load according to one embodiment of this disclosure. The example implementation shown in FIG. 6 is for illustration only. The directional driver 110 of FIG. 5 may be used in other systems without departing from the scope of this disclosure.

The implementation of the directional driver 110 shown in FIG. 6 is similar to the implementation of the directional driver 110 shown in FIG. 4. In this example, the G/S signal 506 is provided from pin G/S of the directional driver 110 to the gate of the transistor 402 and to a resistor 502. The resistor 502 is also coupled to the source of the transistor 402 and to the power supply 118. By providing the G/S signal 506 to the gate of the transistor 402, the transistor 402 may be set into a non-conducting state when the G/S signal is asserted, which may help to reduce or eliminate the effects of reverse power supply installation on the directional driver 110. The resistor 502 may have any suitable resistance.

This implementation of the system 102 also includes a capacitor 504 and a zener diode 506. The capacitor 504 could have any suitable capacitance, such as a capacitance of 47 µF. The zener diode 506 could represent any suitable zener diode or combination of diodes.

The embodiments of the directional driver 110 shown in FIGS. 2 through 6 have illustrated the use of a single state-encoded input signal 112 to control the directional motor 108. FIGS. 7 through 10 illustrate embodiments of the directional driver 110 that use multiple state-encoded input signals 112. For example, the input signals 112 could originate from multiple input signal generators 116. Also, multiple input signals 112 could be used to control the same directional motor 108. By way of example, multiple input signal generators 116 could be used to control the same window 104 in a vehicle 100, such as when a switch on the driver-side door and a switch on the passenger-side door may be used to control the window 104 in the passenger-side door.

Figure 7:
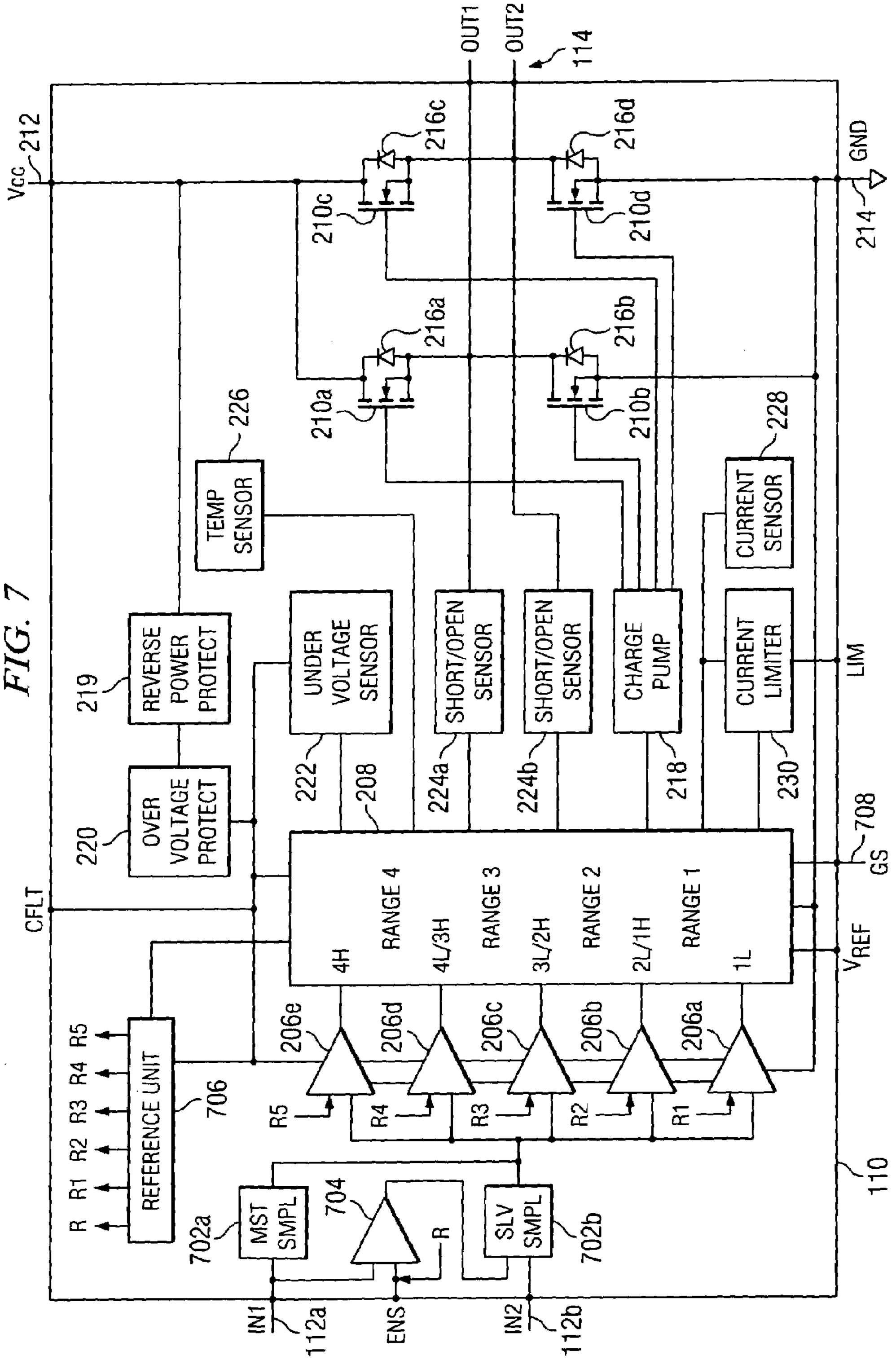
FIG. 7 illustrates a third example directional driver for a directional load according to one embodiment of this disclosure.

FIG. 7 illustrates a third example directional driver 110 for a directional motor 108 according to one embodiment of this disclosure. The embodiment of the directional driver 110 shown in FIG. 7 is for illustration only. Other embodiments of the directional driver 110 could be used without departing from the scope of this disclosure.

In this example, the directional driver 110 receives two state-encoded voltage input signals 112*a*–112*b* at two pins IN1 and IN2. The input signals 112*a*–112*b* are sampled by one or more input sampling circuits 702*a*–702*b*. Each of the input sampling circuits 702*a*–702*b* represents any structure for sampling an input signal and outputting the sample.

As shown in FIG. 7, one of the input signals 112*a* is a master signal, and the other input signal 112*b* is a slave signal. In these embodiments, the directional driver 110 assigns or otherwise treats the input signals 112*a*–112*b* as having a priority, where the master input signal 112*a* has a higher priority than the slave input signal 112*b*. The input sampling circuit 702*a* samples the master input signal 112*a*, and the input sampling circuit 702*b* samples the slave input signal 112*b*. A comparator 704 is used to compare the voltage of the master input signal 112*a* and a measured or calculated reference voltage R. If the voltage of the master input signal 112*a* exceeds the reference voltage R, the comparator 704 outputs a signal disabling the input sampling circuit 702*b*. Otherwise, the comparator 704 outputs a signal enabling the input sampling circuit 702*b*. In this way, the input sampling circuit 702*b* sampling the slave input signal 112*b* may be enabled or disabled depending on whether the master input signal 112*a* has a voltage representing a command. The reference voltage R could be set to any suitable value, such as a voltage that is less than the lowest voltage of the master input signal 112*a* that could represent an encoded command.

Pin ENS is provided in the directional driver 110 for enabling the ability of a master input signal 112*a* to override a slave input signal 112*b*. If pin ENS is not coupled to any other component, the comparator 704 receives the reference voltage R and operates as described above. If pin ENS is coupled to a resistor that is coupled to ground, the input sampling circuit 702*b* may be disabled at all times, ignoring the slave input signal 112*b*.

This embodiment of the directional driver 110 also includes a reference unit 706. The reference unit 706 performs the same functions as the reference unit 204 of FIG.

2, generating the five reference voltages R1–R5. The reference unit 706 also generates the reference voltage R used by the comparator 704. The reference unit 706 represents any mechanism for generating multiple reference voltages, such as one or more voltage dividers.

As shown in FIG. 7, the controller 208 outputs a G/S signal 708 directly to pin G/S without the use of a reverse polarity driver 504 as shown in FIG. 5. However, a reverse polarity driver 504 could be used in the embodiment of the directional driver 110 shown in FIG. 7.

Figure 8:
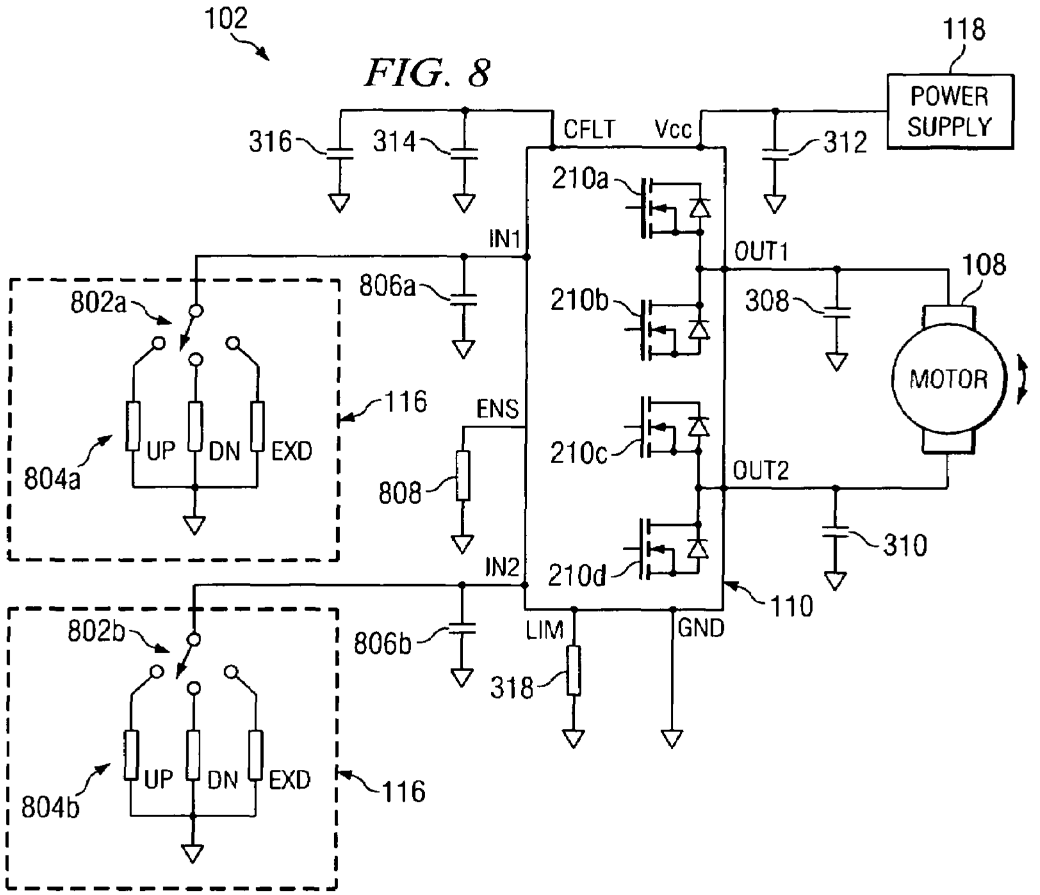
FIG. 8 illustrates an example implementation of the directional driver of FIG. 7 in a system for analog control of a directional load according to one embodiment of this disclosure.

FIG. 8 illustrates an example implementation of the directional driver 110 of FIG. 7 in a system 102 for analog control of a directional load according to one embodiment of this disclosure. The example implementation shown in FIG. 8 is for illustration only. The directional driver 110 of FIG. 7 may be used in other systems without departing from the scope of this disclosure.

The implementation of the directional driver 110 shown in FIG. 8 is similar to the implementation of the directional driver 110 shown in FIG. 3. In this example, multiple input signal generators 116 are used to provide the input signals 112*a*–112*b* to the directional driver 110. The two input signal generators 116 include switches 802*a*–802*b* and resistors 804*a*–804*b*. The input signals 112*a*–112*b* are also provided to two capacitors 806*a*–806*b*. The switches 802*a*–802*b* and resistors 804*a*–804*b* may be the same as or similar to the switch 302 and the resistors 304 shown in FIG. 3. Also, each of the capacitors 806*a*–806*b* may be the same as or similar to the capacitor 306 shown in FIG. 3.

As shown in FIG. 8, a resistor 808 may be optionally coupled to pin ENS of the directional driver 110. As described above, the presence of the resistor 808 causes the directional driver 110 to treat both input signals 112*a*–112*b* equally (input signal 112*a* is not master). By removing the connection to the resistor 808, the directional driver 110 would treat the input signal 112*a* as the master signal and the input signal 112*b* as the slave signal.

Figure 9:
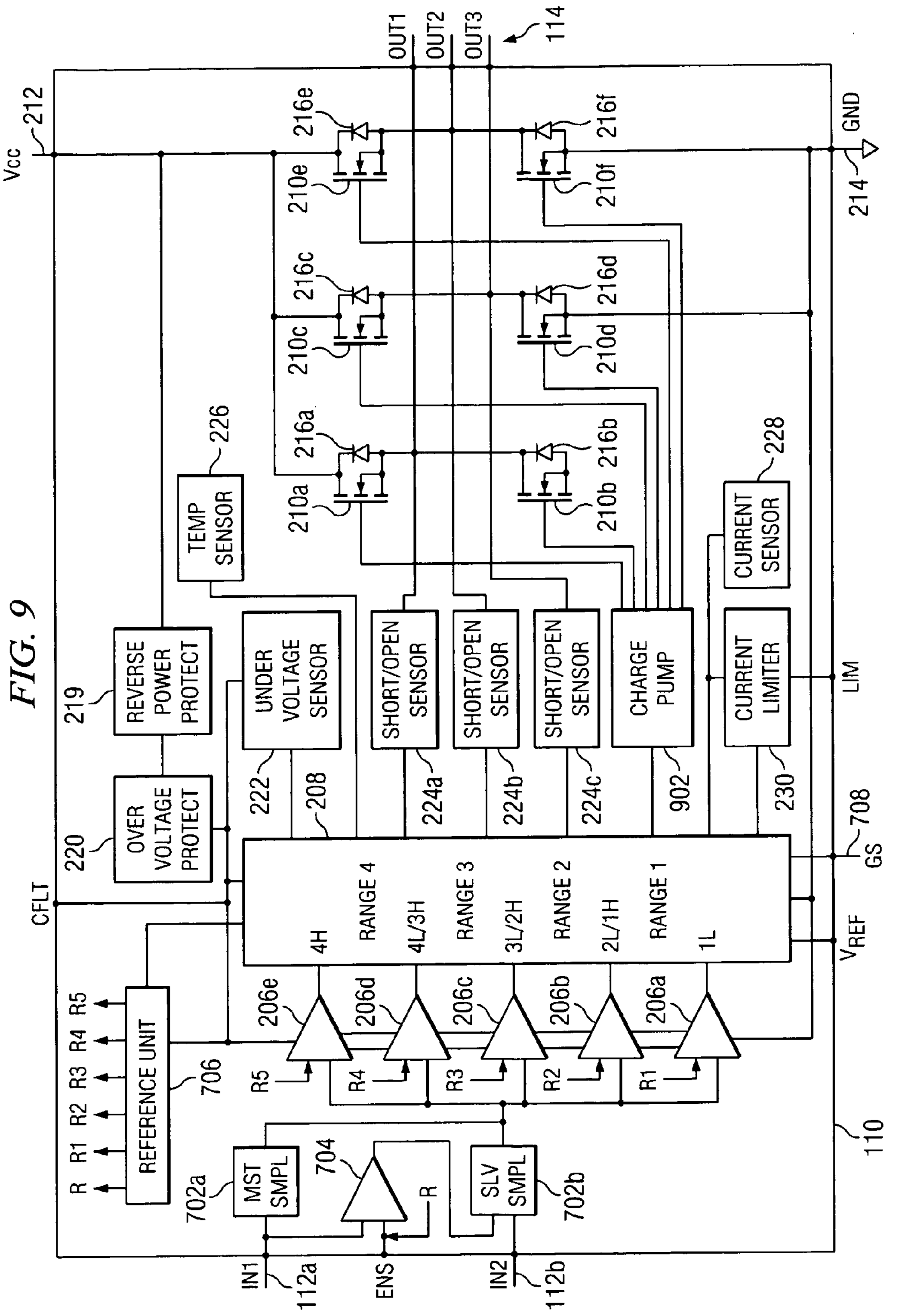
FIG. 9 illustrates a fourth example directional driver for multiple directional loads according to one embodiment of this disclosure.

FIG. 9 illustrates a fourth example directional driver 110 for multiple directional motors 108 according to one embodiment of this disclosure. The embodiment of the directional driver 110 shown in FIG. 9 is for illustration only. Other embodiments of the directional driver 110 could be used without departing from the scope of this disclosure.

In this example, the directional driver 110 controls two different directional motors 108 using three output signals 114 provided at three pins OUT1–OUT3. A combination of two output signals 114 (such as the signals at pins OUT1 and OUT2) control one of the directional motors 108. A different combination of two output signals 114 (such as the signals at pins OUT2 and OUT3) control another of the directional motors 108.

In this embodiment, six switching transistors 210*a*–210*f* are used to generate the three output signals 114. The switching transistors 210*e*–210*f* may operate in a similar manner as the switching transistors 210*a*–210*d*. Also, six diodes 216*a*–216*d* are used to reduce or prevent undesired current flow between the sources and drains of the switching transistors 210*a*–210*f*.

A charge pump 902 is provided for controlling the six switching transistors 210*a*–210*f*. The charge pump 902 may operate in a similar manner as the charge pump 218 of FIG. 2 described above. In this embodiment, the charge pump 902 includes six different outputs, which are used to control the six different switching transistors 210*a*–210*f*. Also, because three output signals 114 are produced, the directional driver 110 includes three short/open sensors 224*a*–224*c*.

Figure 10:
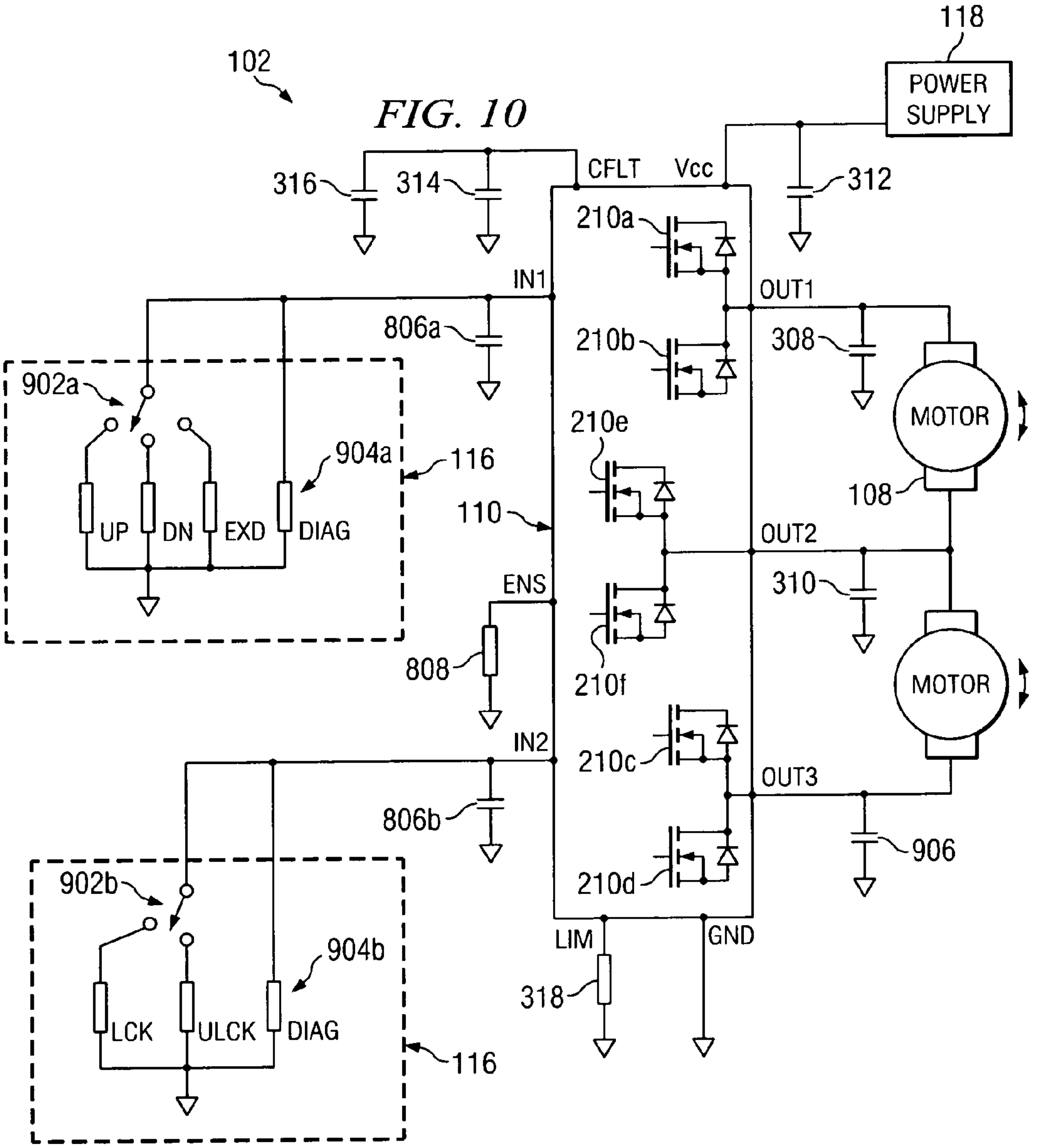
FIG. 10 illustrates an example implementation of the directional driver of FIG. 9 in a system for analog control of multiple directional loads according to one embodiment of this disclosure.

FIG. 10 illustrates an example implementation of the directional driver 110 of FIG. 9 in a system 102 for analog control of multiple directional loads according to one embodiment of this disclosure. The example implementation shown in FIG. 10 is for illustration only. The directional driver 110 of FIG. 9 may be used in other systems without departing from the scope of this disclosure.

The implementation of the directional driver 110 shown in FIG. 10 is similar to the implementation of the directional driver 110 shown in FIG. 8. In this example, multiple input signal generators 116 are used to provide the input signals 112*a*–112*b* to the directional driver 110. The two input signal generators 116 include switches 902*a*–902*b*. One input signal generator 116 also includes four resistors 904*a*, and another input signal generator 116 also includes three resistors 904*b*. In this example, the four resistors 904*a* correspond to three settings for a window 104 (up, down, and express down), plus an additional diagnostic resistor. The three resistors 904*b* correspond to two settings for a door lock 106 (lock and unlock), plus an additional diagnostic resistor. The diagnostic resistors are always coupled between the input pins IN1 and IN2 and ground and may be used to confirm when the switches 902*a*–902*b* are in open positions. The system 102 in FIG. 10 also includes an additional capacitor 908 coupled to the third output pin OUT3. The capacitor 908 may be the same as or similar to the capacitors 308–310.

The implementation of the system 102 shown in FIG. 10 may be used in many different applications where multiple directional motors 108 are controlled. For example, the system 102 shown in FIG. 10 could be implemented in a door of the vehicle 100, where the directional motors 108 control both the window 104 and door lock 106 of the door.

The following represents specific details of particular embodiments of the directional driver 110 shown in any of FIGS. 2 through 10. The following details are provided for illustration only. Other embodiments of the directional driver 110 having different operational characteristics may be used without departing from the scope of this disclosure.

In some embodiments, the directional driver 110 is used in automotive body and chassis applications. Expected operational temperature ranges could range from −40° C. to 85° C. or from −40° C. to 105° C. The directional driver 110 could operate with an input voltage (the voltage of input signals 112) of between 9 VDC and 16 VDC. A reference voltage $V_{REF}$ may be provided to the directional driver 110, which regulates how the input signals 112 are decoded. Load matching may be used to match the impedance of the directional motor(s) 108, such as 16 mΩ, 50 mΩ, or 150 mΩ. The ground pin GND of the directional driver 110 may be coupled to a body sheet metal ground via a housing of a directional motor 108. When in a non-operational state (the input signal 112 is neutral, meaning no command is being received), the directional driver 110 may have a very low quiescent current consumption.

The voltage level on the IN pin(s) of the directional driver 110 controls the output of the directional driver 110. Table 1 illustrates one example of the output signals 114 used by the directional driver 110 to control a directional motor 108 that opens and closes a window 104.

TABLE 1

| IN Signal | Direction | OUT1 | OUT2 |
|---|---|---|---|
| $V_{REF}/1.2$ | Neutral | GND | GND |
| $V_{REF}/1.6$ | Forward or Up | +V | GND |

TABLE 1-continued

| IN Signal | Direction | OUT1 | OUT2 |
|---|---|---|---|
| $V_{REF}/2.0$ | Backward or Down | GND | +V |
| $V_{REF}/2.4$ | | | |
| $V_{REF}/5.0$ | Faulted Off | GND | GND |

In this example, the value of $V_{REF}$ may be divided by the identified factor ±7.5%. The "Faulted Off" state represents an output state of the IN pin that may be monitored by an external controller or other device.

The directional driver 110 could include an output status pin that provides status data to an external controller or other device. The status pin could, for example, output information provided by the controller 208 of the directional driver 110. As an example, the status pin could provide a voltage-coded output signal identifying the first fault detected in the directional driver 110. The output may be latched and maintained until reset. As a particular example, the status pin could output a value of $V_{REF}/1.2$ when no faults are detected. If an over-current fault is detected, pins OUT1 and OUT2 may be sent to ground, and the status pin may output a voltage identifying the over-current fault.

The current provided by the directional driver 110 may be limited using a resistance coupled to the LIM pin. In other embodiments, time may be used as a condition in detecting an over-current condition, where a resistance value is used to select both an over-current limit and a time threshold. Table 2 illustrates different possible current limiting settings of the directional driver 110.

TABLE 2

| Current Limit (as % of max) | Detect Time | Resistance |
|---|---|---|
| 100% | | Open (infinite) |
| 100% | 750 ms | R1 |
| 75% | 350 ms | R2 |
| 50% | 350 ms | R3 |
| 25% | 350 ms | R4 |

Any suitable resistances may be used to identify the last four settings shown in Table 2. Also, when the LIM pin is open, the detect time may have no significance.

The directional driver 110 could also have an enable pin that receives a signal controlling whether the directional driver 110 enables dynamic braking and current limiting. For example, the signal could independently enable each of these functions. Table 3 illustrates one possible encoding scheme for controlling these features.

TABLE 3

| ENABLE pin | Dynamic Braking | Current Limit |
|---|---|---|
| $V_{REF}/1.2$ | Disabled | Disabled |
| $V_{REF}/2.0$ | Enabled | Disabled |
| $V_{REF}/3.0$ | Disabled | Enabled |
| $V_{REF}/4.0$ | Enabled | Enabled |

As noted above, the directional driver 110 may detect various problems (such as over-current and under-voltage problems). The detection of a problem may place the directional driver 110 into one of multiple fault modes, and the fault may be identified through the status pin. For example, if the internally measured current exceeds the selected current limit (based on the resistance, if any, coupled to the LIM pin) for more than the detect time, the outputs of the directional driver 110 may latch off and remain off until reset. In some embodiments, the directional driver 110 only detects over-current faults when current limiting is disabled through the enable pin.

The directional driver 110 could also suffer from an over-voltage problem when the supply voltage 212 exceeds a maximum operating voltage. When this occurs, the directional driver 110 may disable its outputs and report the problem on the status pin. This problem may represent a non-latching problem. In other words, once the supply voltage 212 returns to a voltage that is less than the maximum operating voltage minus an over-voltage hysteresis value, the directional driver 110 may resume normal operation without requiring a reset.

The directional driver 110 could further suffer from excessive temperatures. If the temperature of the directional driver 110 exceeds a maximum operating temperature, the directional driver 110 may disable its outputs. Once the temperature falls below the maximum operating temperature minus an over-temperature hysteresis value, the directional driver 110 may resume normal operation. If cyclic over-temperature conditions are detected (such as five over-temperature conditions in a specified time or during the current "power on" period), the directional driver 110 may disable itself for the remainder of the "power on" period.

In addition, the directional driver 110 could suffer from an under-voltage condition, such as when the supply voltage 212 falls below 9 VDC. When this occurs, the outputs of the directional driver 110 may latch off, and the directional driver 110 should be reset.

In addition to these fault modes, the directional driver 110 may be capable of protecting itself from other problems. For example, the directional driver 110 may be required to survive the application of a reverse voltage as low as −16V caused by reverse installation of a power supply 118. When this occurs, the directional driver 110 could enhance the outputs of the directional driver 110 to keep junction temperatures of the transistors less than 150° C. Also, the directional driver 110 may turn off its outputs if the directional driver 110 is disconnected from ground during use. Further, the directional driver 110 may survive a power supply disconnect during use. External protection could also be provided to protect the directional driver 110 against a power supply disconnect. Beyond that, open outputs (no connection to OUT1 or OUT2) may be detected and reported through the status pin. In addition, an internal over-voltage clamp may be used for the outputs to provide protection and dissipate energy stored in inductive loads. The clamp may independently limit the drain-to-source voltage of the transistors to a specified range.

The directional driver 110 may be fabricated on an insulated metal substrate and/or a high-heat dissipating substrate. The directional driver 110 may be produced as a bare die attached to a printed circuit board (PCB) and represent a composite of three layers (circuit routing layer, epoxy layer, and bottom metal layer). The directional driver 110 could also be designed as a monolithic, trilithic, or other multi-die device with or without thermal packaging enhancements. The packaged directional driver 110 could be placed on an insert-molded lead frame and then placed in a custom or standard housing. Standard or custom automotive connectors could be used to couple the directional driver 110 to other components in a vehicle, such as a central micro-controller.

Although FIGS. 2 through 10 illustrate various example embodiments and implementations of a directional driver 110 for one or more directional motors 108, various changes may be made to FIGS. 2 through 10. For example, while four different voltage ranges are defined by the reference voltages R1–R5, the directional driver 110 could support any number of voltage ranges. Also, various components in the directional driver 110 could be combined or omitted and additional components could be added according to particular needs. Further, the various switches could each include any number of settings, and other or additional types of input devices could be used to generate the input signals 112. Beyond that, features shown as being implemented in one embodiment or implementation of the directional driver 110 could be used in other embodiments or implementations of the directional driver 110. As an example, the transistor 402 and diode 404 shown in FIGS. 4 and 6 could also be used in the implementations shown in FIGS. 8 and 10. In addition, while described as operating based on a voltage level of the input signal(s) 112, the directional driver 110 could operate based on a current level or other characteristic of the input signal(s) 112. As an example, an input sampling circuit could measure the current level of an input signal, and a comparator could compare the measured current level to a reference value.

Figure 11:
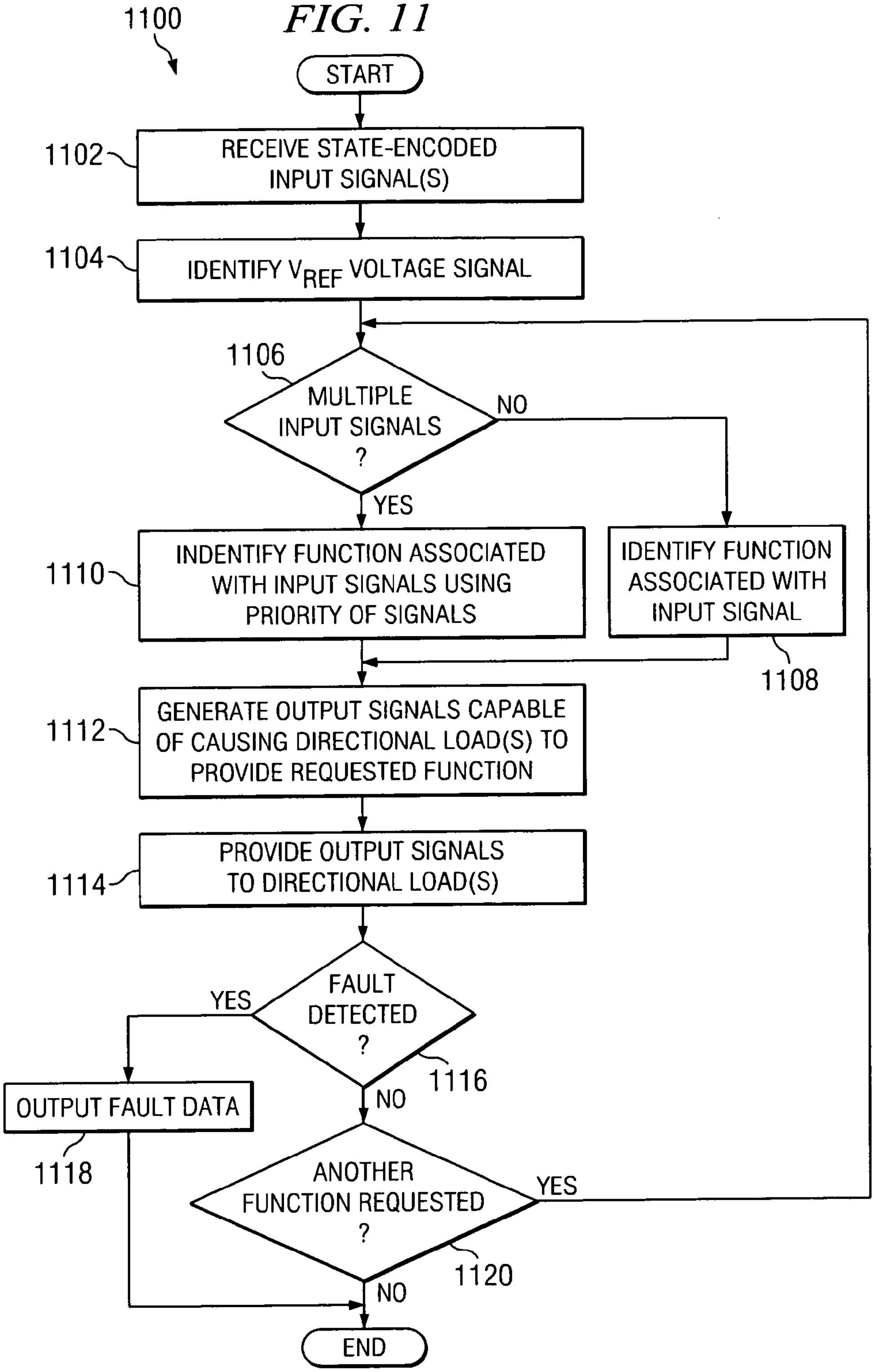
FIG. 11 illustrates an example method for analog control of one or more directional loads according to one embodiment of this disclosure.

FIG. 11 illustrates an example method 1100 for analog control of one or more directional loads according to one embodiment of this disclosure. For ease of explanation, the method 1100 is described with respect to the directional driver 110 of FIG. 2 or FIG. 7 operating in the system 102 of FIG. 1. The method 1100 could be used by any other suitable driver and in any other suitable system.

The directional driver 110 receives at least one state-encoded input signal at step 1102. This may include, for example, the directional driver 110 receiving an input signal 112 through an input pin IN or input signals 112*a*–112*b* through input pins IN1 and IN2. The input signal(s) 112 may originate from any suitable input signal generator(s) 116, such as a user-controlled switch or a central microcontroller.

The directional driver 110 identifies a reference voltage $V_{REF}$ at step 1104. This may include, for example, the directional driver 110 determining if the reference voltage $V_{REF}$ is pulled high or coupled to ground. The reference voltage $V_{REF}$ determines whether the directional driver 110 decodes the state-encoded input signal(s) 112 using a regulated voltage (such as +5V) or an unregulated voltage.

Depending on whether one or multiple input signals are received (and whether a slave one of multiple input signals is ignored) as determined at step 1106, the directional driver 110 identifies a function associated with the input signal(s) at step 1108 or step 1110. Either step may include the reference unit 204 generating multiple reference voltages R1–R5, which may be scaled based on the reference voltage $V_{REF}$. If a single input signal is received, this may also include the input sampling circuit 202 sampling the input signal 112. If multiple input signals are received, this may also include the input sampling circuits 702*a*–702*b* sampling the input signals 112, where the input sampling circuit 702*b* is controlled by the comparator 704 to provide the input signal 112*a* with a higher priority than the input signal 112*b*. Either step may further include the comparators 206*a*–206*e* comparing the sampled input voltage and the reference voltages R1–R5. In addition, this may include the controller 208 receiving the results of the comparisons and identifying the voltage range in which the sampled input voltage falls. The identified voltage range is associated with the requested function.

The directional driver 110 generates output signals capable of causing one or more directional loads to provide the requested function at step 1112. This may include, for example, the controller 208 causing the charge pump 218 to place each of the switching transistors 210*a*–210*d* into an appropriate conducting or non-conducting state. As a particular example, this may include one of the transistors 210*a*–210*b* providing either the source voltage 212 or ground 214 as the first output signal 114 and one of the transistors 210*c*–210*d* providing the opposite as the second output signal 114.

The directional driver 110 provides the generated output signals 114 to the one or more directional loads at step 1114. This may include, for example, the directional driver 110 providing the two output signals 114 to one or more directional motor(s) 108 through the output pins OUT1 and OUT2.

If a fault is detected in the directional driver 110 at step 1116, the directional driver 110 outputs fault data at step 1118. This may include, for example, the controller 208 identifying the fault (such as an under-voltage condition) and outputting a voltage-coded output signal identifying the detected fault. If no fault is detected and another function is requested at step 1120, the directional driver 110 returns to step 1104 to decode and implement the next requested function. Otherwise, the method 1100 ends.

Although FIG. 11 illustrates one example of a method 1100 for analog control of one or more directional loads, various changes may be made to FIG. 11. For example, the directional driver 110 could perform any additional actions, such as taking protective action when one or more faults are detected in the directional driver 110. Also, various steps could be performed in parallel.

It may be advantageous to set forth definitions of certain words and phrases used in this patent document. The terms "include" and "comprise," as well as derivatives thereof, mean inclusion without limitation. The term "or" is inclusive, meaning and/or. The term "each" refers to every of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "controller" and "microcontroller" mean any device, system, or part thereof that controls at least one operation. A controller or microcontroller may be implemented in hardware, firmware, or software, or a combination of at least two of the same. It should be noted that the functionality associated with any particular controller or microcontroller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A directional load driver, comprising:

a controller capable of identifying a function associated with a state-encoded input signal;

a plurality of transistors capable of generating a plurality of output signals and providing the output signals to a directional load, the directional load capable of operating in a plurality of directions, the output signals causing the directional load to operate in one of the directions to perform the identified function;

an input sampling circuit capable of providing an analog sample of the state-encoded input signal; and a plurality of comparators capable of comparing the analog sample to a plurality of references, the references defining a plurality of ranges, the ranges associated with a plurality of functions including the identified function.

2. The driver of claim 1, wherein the analog sample comprises one of: a voltage of the state-encoded input signal and a current of the state-encoded input signal.

3. The driver of claim 1, wherein the plurality of transistors comprises two transistors capable of generating one of the output signals, the two transistors comprising:

a first transistor capable of providing a source voltage as the output signal; and a second transistor capable of providing ground as the output signal.

4. The driver of claim 1, further comprising:

a charge pump coupled to gates of the transistors, the charge pump capable of placing each of the transistors into a conducting state or a non-conducting state to generate the output signals, wherein the controller is capable of controlling the charge pump.

5. The driver of claim 4, wherein at least one of the controller and a reverse polarity driver is capable of outputting a signal identifying a reverse installation of a power supply.

6. The driver of claim 1, wherein:

the controller is capable of identifying the function using one of a plurality of state-encoded input signals; and the driver further comprises:

a plurality of input sampling circuits capable of providing analog samples of the state-encoded input signals; and a comparator capable of comparing an analog level of one of the state-encoded input signals to a reference, an output of the comparator capable of enabling and disabling the input sampling circuit receiving another of the state-encoded input signals.

7. The driver of claim 6, wherein the transistors are capable of providing the output signals to one of a plurality of directional loads.

8. The driver of claim 1, further comprising:

a current limiter capable of limiting an amount of current provided in the output signals, the amount of current associated with a resistance coupled to the current limiter.

9. The driver of claim 1, further comprising at least one of: a temperature sensor coupled to the controller, a current sensor coupled to the controller, an under-voltage sensor coupled to the controller, an over-voltage protector coupled to the controller, a short circuit sensor coupled to the controller, and an open circuit sensor coupled to the controller.

10. The driver of claim 1, wherein:

the directional load comprises a directional motor in a vehicle, the directional motor capable of operating in multiple directions; and the identified function comprises one of: opening one or more windows, closing one or more windows, express opening one or more windows, express closing one or more windows, unlocking one or more door locks, locking one or more door locks, moving one or more seats, moving one or more windshield wipers, adjusting one or more rear-view mirrors, opening one or more doors, closing one or more doors, opening one or more sunroofs, and closing one or more sunroofs.

11. The driver of claim 1, wherein the directional load comprises a directional load used with one of: a residential door lock, a home automation system, and an industrial control.

12. The driver of claim 1, wherein the controller is capable of receiving a second input signal and using the second input signal to determine whether the driver is receiving a regulated or unregulated supply voltage.

13. The driver of claim 12, further comprising a reference generator capable of generating a plurality of references, the reference generator further capable of scaling the references when the driver receives an unregulated supply voltage, the scaled references used to identify the function associated with the state-encoded input signal.

14. A system, comprising:

a directional load capable of operating in a plurality of directions to perform a plurality of functions;

an input signal generator capable of generating a state-encoded input signal identifying one of the functions; and a directional load driver capable of identifying the function associated with the state-encoded input signal, generating a plurality of output signals, and providing the output signals to the directional load, the output signals causing the directional load to operate in one of the directions to perform the identified function, wherein the directional load driver includes an input sampling circuit capable of providing an analog sample of the state-encoded input signal and a plurality of comparators capable of comparing the analog sample to a plurality of references, the references defining a plurality of ranges, the ranges associated with a plurality of functions.

15. The system of claim 14, wherein the directional load driver further comprises:

a controller capable of identifying one of the functions using outputs of the comparators; and a plurality of transistors capable of generating the output signals, wherein the controller is capable of controlling the transistors.

16. The system of claim 15, wherein the directional load driver further comprises at least one of:

a charge pump capable of placing each of the transistors into a conducting state or a non-conducting state to generate the output signals, wherein the controller is capable of controlling the charge pump to thereby control the transistors; and a current limiter capable of limiting an amount of current provided in the output signals, the amount of current associated with a resistance coupled to the current limiter.

17. The system of claim 15, wherein:

at least one of the controller and a reverse polarity driver is capable of outputting a signal identifying a reverse installation of a power supply; and the signal is provided to a gate of a transistor coupling the power supply to the directional load driver.

18. The system of claim 14, wherein:

the directional driver is capable of receiving a plurality of state-encoded input signals from one or more input signal generators; and the directional load driver comprises:

a plurality of input sampling circuits capable of providing analog samples of the state-encoded input signals; and a comparator capable of comparing an analog level of one of the state-encoded input signals to a reference, an output of the comparator capable of enabling and disabling the input sampling circuit receiving another of the state-encoded input signals.

19. The system of claim 14, wherein the input signal generator comprises:

a switch having a plurality of settings; and a plurality of resistors, each resistor associated with one of the plurality of settings.

20. The system of claim 14, wherein the input signal generator is coupled to the directional load driver by a single wire.

21. A method, comprising:

receiving a state-encoded input signal identifying a function associated with a directional load over a single wire, the directional load capable of operating in a plurality of directions;

generating a plurality of output signals associated with the function, wherein generating the plurality of output signals includes providing an analog sample of the state-encoded input signal, comparing the analog sample to a plurality of references, and identifying a range in which the analog sample falls based on the comparisons, the range associated with the function; and providing the output signals to the directional load, the output signals causing the directional load to operate in one of the directions to perform the function.

22. The method of claim 21, wherein generating the plurality of output signals further comprises:

causing a plurality of transistors to generate the output signals using a charge pump based on the identified range.

23. The method of claim 21, wherein:

receiving the state-encoded input signal comprises receiving a plurality of state-encoded input signals, at least some of the plurality of state-encoded input signals having different priorities; and generating the plurality of output signals comprises:

providing an analog sample of a first of the state-encoded input signals;

providing an analog sample of a second of the state-encoded input signals if an analog level of the first state-encoded input signal does not exceed a first reference;

comparing at least one of the analog samples to a plurality of second references;

identifying a range in which at least one of the analog samples falls based on the comparisons, the range associated with the function; and causing a plurality of transistors to generate the output signals using a charge pump based on the identified range.

* * * * *